June 10, 1952  W. E. BARBER ET AL  2,600,090
ANTIVIBRATION MOUNTING DEVICE
Filed July 31, 1946  5 Sheets-Sheet 1

Inventors
William Edward Barber
James Ormond Cole
By Morss, Nolte, Crews & Berry attys June 10, 1952  W. E. BARBER ET AL  2,600,090
ANTIVIBRATION MOUNTING DEVICE
Filed July 31, 1946  5 Sheets-Sheet 2

June 10, 1952 W. E. BARBER ET AL 2,600,090
ANTIVIBRATION MOUNTING DEVICE
Filed July 31, 1946 5 Sheets-Sheet 3

Inventors
William Edward Barber
James Ormond Cole
By Moses, Nolte, Crews & Berry
Attys.

June 10, 1952  W. E. BARBER ET AL  2,600,090
ANTIVIBRATION MOUNTING DEVICE
Filed July 31, 1946  5 Sheets-Sheet 4

Inventors
William Edward Barber
James Ormond Cole
By Moses, Nolte, Crews & Berry
Attys.

Patented June 10, 1952

2,600,090

UNITED STATES PATENT OFFICE 2,600,090

ANTIVIBRATION MOUNTING DEVICE

William Edward Barber, Woking, and James Ormond Cole, Barnehurst, England, assignors to A. Wells & Company Limited, London, England Application July 31, 1946, Serial No. 687,384
In Great Britain July 22, 1943

Section 1, Public Law 690, August 8, 1946
Patent expires July 22, 1963

10 Claims. (Cl. 248—358)

This invention is a continuation-in-part of our application Serial No. 602,556, filed June 30, 1945, now abandoned. It relates to anti-vibration mounting devices, particularly to resilient mounting devices suitable for use in supporting bodies such as wireless, indicating, and like instruments or equipment in structures such as aircraft which are subject to vibration, shocks, or rolling and pitching. In such cases it is desirable to so mount the supported body that equal reaction is exerted by the flexible mounting in whatever plane the body tends to move under the effects of vibration, shock, or other force; and the principal object of this invention is to provide improved mounting devices in which this result is secured to a considerable degree. Other objects consist in the provision of improved combinations of parts and details of construction making for efficiency and ease of manufacture of such devices.

Our improved device consists essentially of a pair of resilient like coaxial opposed truncated hollow cones, joined at their bases to a member which may be termed a base plate and at their opposite ends to the end portions of a member which forms a central floating column, which extends axially through the two cones and through a central opening in the base plate, both cones being under tension when the device is not loaded. The base plate may be the supporting member for the device and the central column member may in effect be the supporting member for the instrument or other body which is to be mounted resiliently, or the functions of these members may be reversed. The generating lines of both cones form the same angle with the base plate, this angle being one that varies somewhat, between about 30 and 45 degrees in accordance with different conditions, as will be explained. A device so made is designed for a rated load, and will give equal deflection regardless of whether such load is applied in an axial or in a radial direction, and further, will yield equally in response to vibration, shock or other force tending to move the supported body, in whatever plane such body tends to move under such impulse, throughout a known range of deflection values.

The device, embodying the same principles, may be constructed with the resilient cones formed of sheet rubber; or the flexible member may be formed of rubber webs or strips forming elements or parts of conical surfaces; or metal springs, similarly forming conical elements, may be used. With the sheet rubber cones, the device may and preferably is made in the form of two mouldings, which are secured together to produce the complete unit, while with the rubber webbing type of device, the same may and preferably is formed as a single moulding, as will be explained.

In order that the invention may be more clearly understood, attention is directed to the accompanying drawings, illustrating by way of example certain embodiments of the invention. In the drawings—

Referring first to Figs. 1 to 5, the mounting device here shown comprises two exactly similar parts. Each embodies a metal base plate 1 in which there is a comparatively large central circular hole. A hollow truncated cone 2 of rubber, under tension, extends upwardly from plate 1 the cone having an annular flange 2a bonded to the plate surrounding the central opening. The generating lines of the cone form an angle with plate 1, which will be determined by a number of factors to be explained, and which will be between about 35 and 45 degrees. Extending through the apex of the cone is an axially-extending metal tube or sleeve 3 to the upper end portion of which the rubber of the cone is bonded. This tube is of a length such that, when the complete device is assembled, its end opposite to that to which the rubber is secured will lie in the central plane of the device transverse to the axis thereof. Fixed on a shoulder 3b on the tube 3 is a metal plate 4, the purpose of which will presently be described.

The two parts, each of which is formed as above described, are arranged with their base plates 1 against each other, these plates being secured together by welding, riveting or other suitable means. They will then form, together, a single base member for the device, with the inner ends of the central axial tubes 3, 3 abutting against each other to form a continuous tube adapted to receive, and having clamped therein, a securing device, bolt or screw, such as the bolt 5 to which the instrument or other body which is to be resiliently mounted may be secured. The instrument may, for example, be provided with a bracket member, such as 6 (indicated in Fig. 3 in dot and dash lines), whereby it can be secured to the bolt 5.

The mounting device, in the form illustrated, may be supported by a pedestal 7 to which the base member 1, 1 is secured, and which is itself attached to the structure, such as an aircraft, in which the instrument is mounted. A number of such devices, say three or four, may be used to support an instrument, as indicated for example in Figs. 4 and 5, in which part of the case of the instrument is indicated at 8, to which the bracket members 6 are bolted.

It will be seen that the tubes 3, 3 form a central floating column which is held in axial position by the attachment thereto of the truncated rubber cones, which are held under equal tension when the device is not loaded. This tension may be produced by making the two tubes 3, 3 of such a length that when they abut end to end the rubber of the two cones will be equally stretched, to a desired extent. It will also be observed that the generating lines of the cones, if extended, would form apices, on the axis of the tubes 3, 3 adjacent to the junctions of the rubber members with the tubes 3, 3 the rubber cones necessarily being somewhat truncated because of the fact that their outer ends are secured to tubular (or columnar) members which, although of much less diameter than the circular opening in the plate, must nevertheless be of a diameter sufficient to give them the necessary strength.

Figure 6:
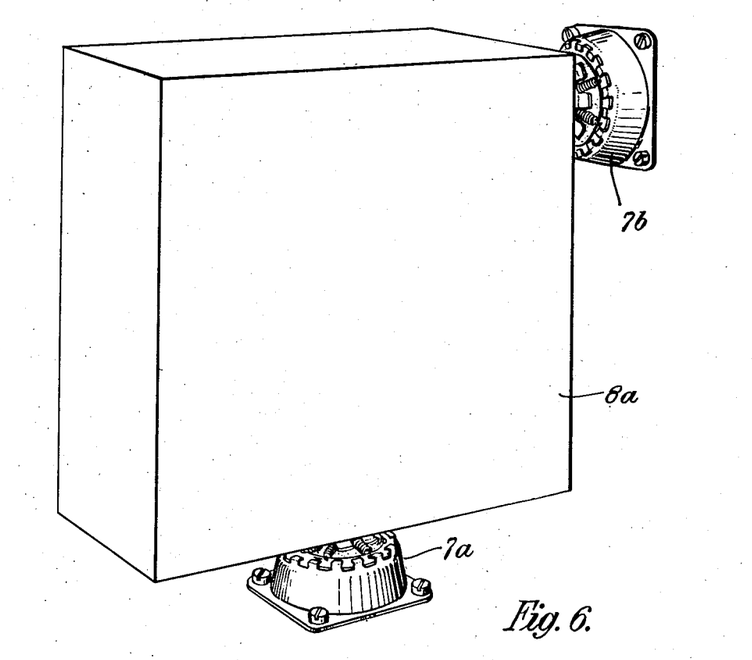
Fig. 6 is a perspective view showing another manner of mounting a casing, in which it is supported by mounting devices applied to adjacent sides thereof.

With a device so constructed, the rated load for the device may be applied either axially or radially, and, the angle of the cones being properly selected, the deflection of the cones under such load will be substantially the same, regardless of the direction in which the load is applied. Thus, with the axially-applied load indicated in Fig. 5, the device may either be mounted upon a shelf or platform, or suspended from the ceiling, it being immaterial whether the load is applied axially in one direction or in the reverse direction. Another form of mounting is shown in Fig. 6, in which the casing 8a is supported by devices similar to that described above, of which one, having a pedestal 7a, may be mounted on the floor or other horizontal base, while the other similar device, having a pedestal 7b, may be secured to a vertical wall of the aircraft or other structure. With this arrangement, vertically acting forces are transmitted axially to the rubber cones of the device having the pedestal 7a, and radially to the cones of the device having the pedestal 7b, and in fact the casing may be turned in any direction, to rest upon or be suspended from any of its four sides, with the mounting device the axis of which is then horizontal secured to a vertical surface, with the result that, the mounting devices being loaded in any direction, the deflection of their resilient cones will be substantially the same. It is of course obvious that a screw may be substituted for the bolt 5 which passes through the tube 3, 3 in the device shown in Fig. 3, and the devices shown in Fig. 6 may, if required by the form of casing 8a be secured thereto by such screws.

Figure 19:
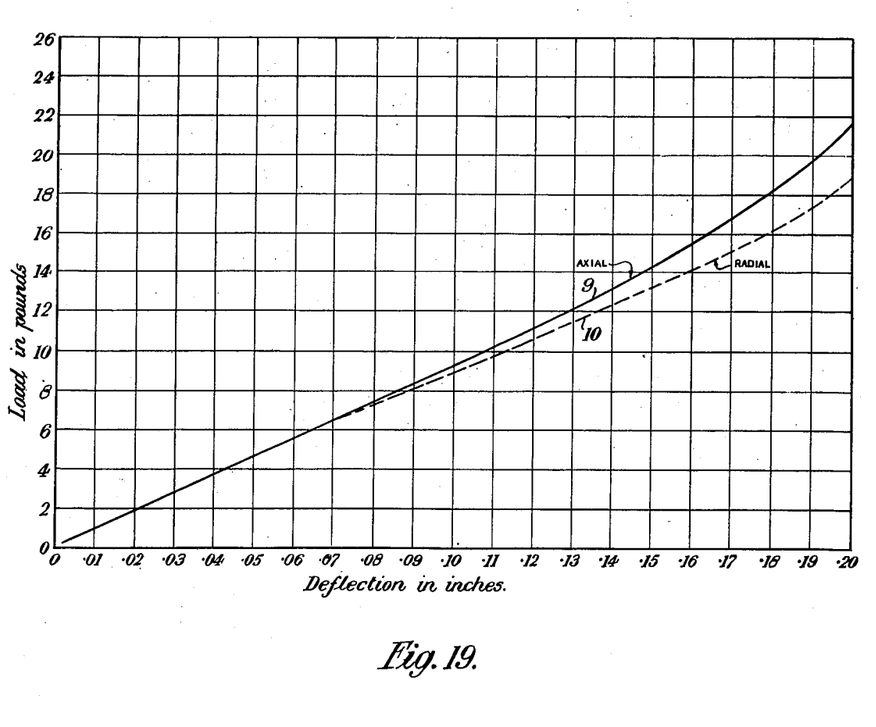
Fig. 19 is a graph showing the deflections in the axial and radial directions of a typical embodiment of the invention under different loads.

With such devices, further deflection of the rubber cones under vibrations, shock or the like, will be substantially the same, regardless of the direction in which such forces act, so long as such forces of an abnormal strength are not encountered. This is indicated by the graph, Fig. 19, in which the deflection of the cones of a mounting device of the character above-described is recorded under varying loads, applied both axially and radially. In this graph the relative reactions of the resilient mounting for axially and radially applied loads are shown by the curves 9 and 10, respectively, and it will be seen therefrom that, for the particular device tested, curves 9 and 10 are superimposed one on the other for loads up to about 7 lbs., at which the deflection was between .07 and .08 inch, after which the said curves diverge, at first very slightly and thereafter to a somewhat increasing extent. It will be understood that different sizes of the device are necessary to provide a range capable of, for example from ½ lb. to some 40 lbs. load suspension per unit (two or more devices being employed for the suspension of a load), at a predetermined deflection under the rated load for which each device is designed. This deflection may be, for example, approximately $\frac{1}{16}$ inch, which, in the example shown in Fig. 19, would correspond to a load of about 6 pounds per device. Therefore, if the specimen tested was rated for 6 lbs. load, its axial and radial deflection will be seen to be the same for all loads up to something more than its rated load.

Means may be added to the device for preventing excessive movement under abnormal conditions, as in the case of a violent shock being received. Thus, preferably, the washers or metal rings 4, 4, previously referred to, are mounted on the ends of tubes 3, 3. In the case of excessive load or displacement in the axial direction of the central column one of these rings may come into contact with the edge portion of the rubber disc which is bonded to the baseplate. The annular bonded portion 2a of each cone is preferably provided with a series of bosses 11 which act as buffers to receive the impact of the snubber plates 4, thus preventing metal to metal contact between the supported body and the base plate. The snubber plates 4 may, if desired, have their edges turned down, in the manner shown in Fig. 15, to form contact surfaces.

Also, if desired, a sleeve or washer 12 may be positioned about the tubes 3, 3 within the device, extending across the plane in which the ends of these tubes abut against each other. The diameter of this washer 12 is less than the internal diameter of the cones in any plane parallel to the base plate, but is such that with excessive lateral movement of the cones their interior surfaces will abut against the same. It will be seen that the distance between washer 12 and the inner surface of the cones in the plane of the base plate is substantially the same as the distance between stop plates 4 and the bosses 11 against which they are adapted to contact in the event of excessive movement. It is obvious that, with a device intended to give equal deflection regardless of whether the load or force tending to move the supported body is applied in an axial or in a radial or other direction, it is advisable that excessive movements in both axial and radial planes should be stopped at points corresponding to approximately equal applications of force.

We have found that the described equal flexibility, and equal resistance of the rubber cones to relative movement between the base member and the central columnar member, in response to equal forces acting in any direction (up to a certain point as described), are obtained and are only possible when the cones are hollow and when the angle formed by the generating lines of the two cones with the base member are correctly chosen. As to the latter consideration, it was found that some variation from the 45° angle (that might have seemed the correct one, without consideration of all the factors involved) was, in most cases, required. The thickness of the rubber of the cones must be chosen in accordance with the mass of the body to be supported and the forces to be encountered, and the correct angle of the cones, to give equal resistance in both the axial and radial directions as described, is found to vary somewhat in accordance with this thickness. It is also found that a certain angular relationship, found to be correct when the cones are formed from one rubber compound, does not give exactly the same results if a different quality of rubber is employed. For example, with a 45° angle, a rubber mix of some 40-Shore hardness will in all probability be softer and less resistant in the radial direction than in the axial, but, if the angle is adjusted, for this mix, to give equal resistance in both directions, it will be found, if another compound of some 65–70 Shore hardness is employed, that the cones are now probably less resistant in the axial than in the radial, so that a certain opposite adjustment is required. Therefore, since different hardnesses of mountings may be necessary in producing a range of devices designed to support different loads, a number of models, having angles differing slightly from each other, will be required, if best results are to be obtained and a wide range of loads are to be supported by the devices manufactured. The correct angles should therefore be determined by tests for the various cases, and will be found to lie within a range of about 35 to 45 degrees, where the cones are of sheet rubber as described. It should of course be understood that the variations from optimum results may be small, if an angle is left unchanged when the rubber hardness or other factor is changed, as above described, so that results sufficient for some purposes may be obtained when the careful adjustments above described are not made, but where axial and radial deflection are to be identical throughout a predetermined range, as described, proper care must be taken to ensure the correct angle.

The central column should be maintained in its correct position, normal to the base plate, which is ensured by the fact that the two cones are maintained under equal tension when the device is not loaded. When the device is loaded in an axial direction, the cone farthest from the suspended load is stretched further, while the cone nearest to the load is allowed to contract within itself, and takes no part in the load-bearing operation, but in the event of a reverse load force being applied, the opposite action takes place, and similar results are obtained when the device is loaded in the radial direction. Similar effects are also obtained when forces are encountered acting at angles in between the axial and radial directions, the device producing equal flexibility in all such cases. It will be seen that, because of the fact that the cones are hollow, no compression of any part of the same is effected, and the stretching elastic properties of the mounting only are employed in the action of the device.

Figure 10:
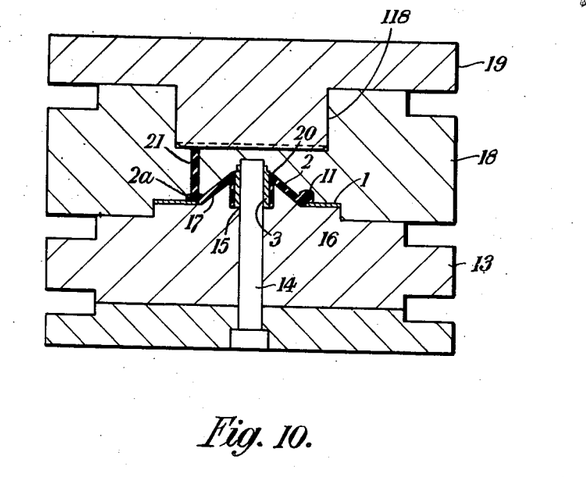
Fig. 10 is a vertical section through a mould, illustrating the preferred use of a moulding step in producing the form of device shown in Figs. 1 to 3.

Instead of having the edges of the rubber cones bonded to the base plates 1, 1 they may, of course, be otherwise secured thereto, as by clamping them with rings, in which case only one base plate would need to be used, in place of two. The construction previously described and shown is preferred, however, since with this form a simple and efficient moulding technique may be employed in manufacture. This operation is indicated in Fig. 10, in which the lower mould member 13 is provided with a vertical central pin 14, member 13 having a cylindrical opening 15 surrounding the upper part of the pin, into which one of the tubes 3 required for the central column of the device, is inserted. Mould member 13 is provided with an horizontal annular surface 16 on which the annular base plate 1 is positioned. Between surface 16 and cylindrical opening 15 the upper surface of member 13 is provided with a surface 17 which constitutes a truncated cone, the angle of which with the horizontal surface 16 is the angle chosen as suitable for the rubber cone 2 for the mounting device for a particular rated load which is being manufactured.

The upper mould member 18 has a bottom surface shaped to coact with the upper surface of member 13 and cut away suitably to accommodate the rubber cone, of a desired thickness of rubber, during the moulding. A pellet of raw rubber containing suitable vulcanising ingredients and of required weight or volume, is placed, after closing the mould, in a recess 118 in the upper mould member and heat and pressure applied, in a suitable press, through a third mould member 19. This will result in the rubber mix flowing to fill all available recesses, and to form the cone 2, which, at the end of the cure, will be bonded to base plate 1 at the annular flange 2a of the cone, and to the upper end portion of tube 3 as is indicated at 20. The bosses or buffers 11, on flange 2a of the cone previously referred to, may be formed at the same time in suitable recesses in the bottom face of mould member, 18. A sprue-hole 21 is provided in member 18 to give the rubber access to the mould cavity.

The mould is opened after the product has been cured, pin 14 knocked out and the moulded product then removed after which it only remains to remove the flash where formed, secure the plate 4 on the upper end of tube 3, and secure the base plate 1 to the base plate of an entirely similar half unit, as previously explained, with the end of tube 3 abutting against the end of the corresponding tube 3 of the other half unit. If desired, the washer 12 may be slipped over the two tubes 3 before the base plates are secured together.

Figure 7:
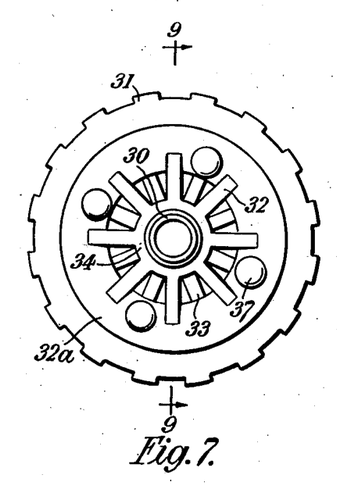
Fig. 7 is a plan view of a second form of the device in which the flexible member is formed of rubber webs, the top stop plate not being shown.
Figure 8:
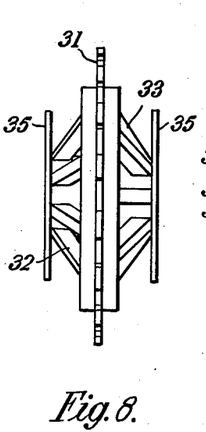
Fig. 8 is a side view of the same, the buffers which may be engaged by the stop plates not being shown.
Figure 9:
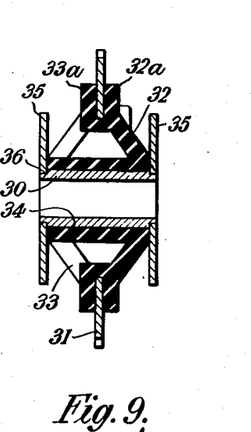
Fig. 9 is a section on line 9—9 of Fig. 7.

A second embodiment of our device is shown in Figs. 7 to 9 of the drawings, in which the resilient members are formed of webs or strips of rubber, the outer surfaces of which constitute elements or surfaces of coaxial opposed truncated cones. The device in this form is similar in its action to that previously described, but it can conveniently be formed, by moulding, in one operation, only one base plate, and one central tube (or other columnar means), being required if the device is made, in the form illustrated, by moulding.

Figure 1:
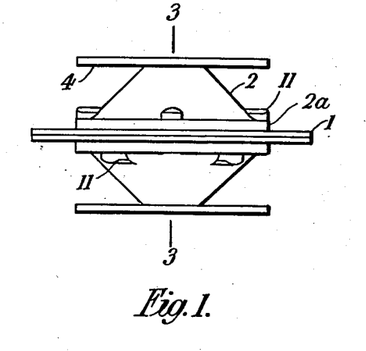
Fig. 1 is a side elevation of one form of the device in which the flexible member comprises opposed truncated hollow cones of sheet rubber.
Figure 2:
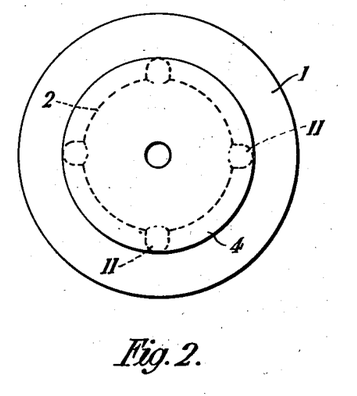
Fig. 2 is a top or bottom plan of the same.
Figure 3:
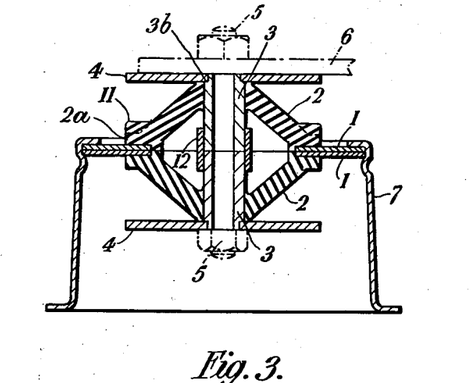
Fig. 3 is a vertical secttion on the line 3—3 of Fig. 1, this also showing in section a pedestal on which the device may be supported.
Figure 4:
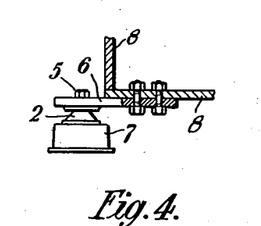
Fig. 4 is a detail view, partly in elevation and partly in section, showing one method of attaching the body to be supported to a mounting device.
Figure 5:
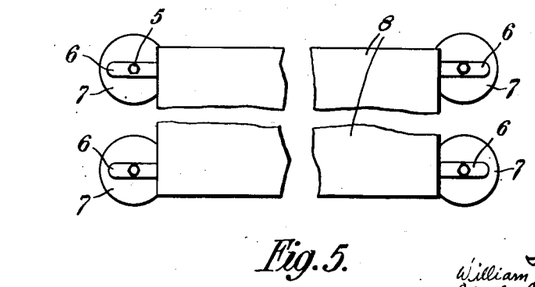
Fig. 5 is a plan view showing the body supported by four of the mounting devices, in the manner indicated in Fig. 4.

As illustrated, this form of the device embodies a central tube 30 of metal, and a metallic annular base plate 31, these elements being connected by webs of rubber forming elements of opposed truncated cones. These webs may comprise a suitable number, such as eight webs 32 forming elements of one cone, which may be termed the upper cone, and the same number of webs 33 forming elements of the other or lower cone. These webs are all equally spaced, but the webs of the two cones are staggered, each web of the lower cone occupying a position, circumferentially of the device which is midway between two webs of the opposite or upper cone. The webs of the two series, respectively, extend into and are integral with flat rubber rings 32a, 33a, which are bonded or otherwise secured to the opposite faces of base plate 31, while at their outer ends all the webs are secured to (preferably, as shown, are integral with) a rubber sleeve member 34, which surrounds and is bonded to the central metal tube 30. Stop plates 35, 35 similar to the plates 4, described in connection with the device illustrated in Fig. 3, are mounted on shoulders 36 on the ends of tube 30 and bosses or buffers 37 may be formed on the surfaces of annuli 32a, 33a, which may be contacted by the stop plates, to prevent excessive axial movement of the resilient portions of the device, as explained in connection with the device illustrated in Fig. 3.

For clearness of illustration, the top stop plate 35 is not shown in Fig. 7, nor the buffer bosses 37 in Fig. 8.

In this form of the device, the correct angle of the generating lines of the cones will be subject to considerations similar to those described in connection with the continuous-cone type of device, and it will be found that the angle formed by the webs with the base plate is between about 35 and 45 degrees. The web members, as shown, extend radially of the device in planes which are perpendicular to the base member, and are put under tension, which should be the same for both of the conical web constructions, during the process of manufacture of the device and bonding of the rubber to the metal parts. The web members and other parts are of thicknesses and sizes suitable for the loads which the particular devices are designed to support, and the hardness of the rubber compound used will be governed similarly. This form of device is adapted to give equal resistance to relative movement between the base plate and central column in all planes, up to a predetermined amount of deflection, in the same manner as explained in connection with the form of device first explained.

Figure 11:
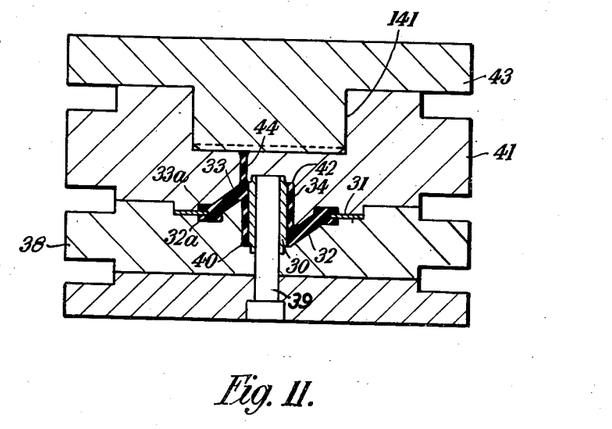
Fig. 11 is a similar section through a different mould, illustrating the preferred use of moulding in producing the form of device shown in Figs. 7-9.

The device last described may conveniently be formed in one operation by moulding (except for the putting on of the stop plates 35, 35). This is indicated in Fig. 11, where the lower mould member 38 is provided with a vertical central pin 39, member 38 having a cylindrical opening 40 surrounding the pin and extending part way down from the upper surface towards the base of the member. The upper part of this pin extends above the top surface of member 38, so that when the upper mould member 41 is closed against member 38 the pin will extend into an axial cylindrical opening 42 in member 41 aligned with opening 40 in member 38. These aligned openings are of a diameter sufficient to hold the metal tube 30, which is inserted in the opening 40 about pin 39, and also to accommodate the rubber sleeve 34 when it is formed therein. Mould member 38 is provided with an annular horizontal surface on which base plate 31 is positioned, and both mould members 38 and 41 are formed with suitable recesses in which the rubber may flow to form the webs 32 of one cone, and the webs 33 of the opposite cone, both to form the selected angle with the base plate, as well as to form the rubber ring portions 32a and 33a of the two cones.

In operation, the tube 30 and base plate 31 are mounted in position in member 38, a pellet of rubber of required weight or volume placed in the cavity 141 in the upper member 41, the mould closed, and heat and pressure applied through a third member 43 until the rubber has flowed through sprue channel 44 and filled all recesses to form the webs and the central sleeve, and the sleeve to become bonded to the central metal tube 30 and the annular base portions 32a and 33a of the two cones to become bonded to base plate 31. After curing the mould is opened, pin 39 knocked out, and the moulded article then ejected upwards from the lower mould member, this being possible because of the fact that the webs of the lower cone are in alignment with the spaces between the webs of the upper cone, so that there is no metal part of the lower mould member directly above the lower webs 32. The rubber shrinks during curing, with the result that the webs of the two cones will be under equal tension in the moulded article. After removal of the moulded product, it is only necessary to clear off the flash and mount the stop plates 35, 35 to complete the device. The buffer bosses 37, if desired, may of course also be formed in the moulding operation, by providing the mould members 38 and 41 with suitable recesses for their formation.

A further embodiment of the invention is illustrated in Figs. 12 to 17 of the drawings, in which helical metal springs are employed in place of the conical rubber elements of the forms of the device previously described. In this construction the springs constitute elements of two like opposed hollow resilient truncated cones, under equal tension when the device is not loaded. This is the same in effect as in the case of the rubber-web construction which has just been described, but with the metal springs it is found that the angle between each conical surface and the base plate should be somewhat smaller in most cases than with the rubber constructions, namely, between about thirty and forty degrees, in order that equal deflection in response to equal forces acting in different directions should be obtained, as above explained.

Figure 12:
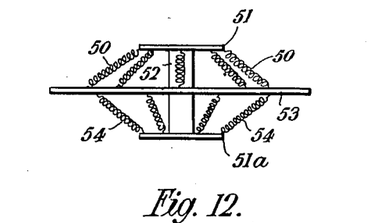
Fig. 12 is a diagrammatic view in elevation of another embodiment of the device in which helical metal springs are employed to form the resilient member.
Figure 13:
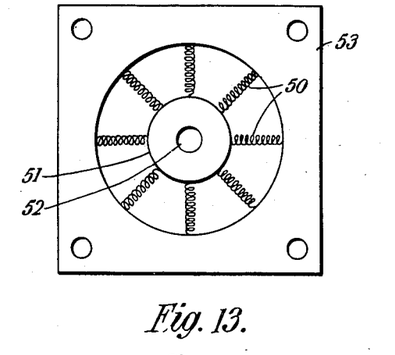
Figs. 13 and 14 are top and bottom plan views, respectively, of the same.
Figure 14:
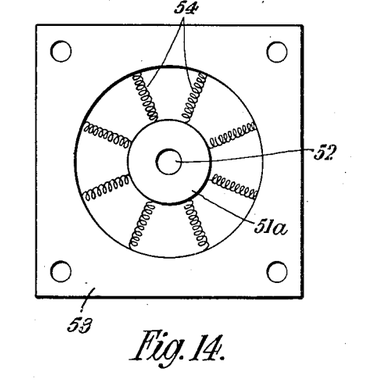

In the construction indicated diagrammatically in Figs. 12–14, the springs 50 of the upper cone are anchored at their upper ends to a flange or the like 51 on the central tube or column 52 and at their other ends to the base plate 53 adjacent to the edge of the central opening therein through which tube 52 passes. The axis of each spring, in the construction illustrated, lies on a generating line of the cone, as many springs being employed, preferably as space conveniently permits and the nature of the load requires. In these figures eight upper springs 50 are employed, and eight springs 54 of the lower or opposed cone, these latter lying on the generating lines of the lower cone and being anchored at their upper ends to the base plate and at their opposite ends to a flange 51a on the central tube 52. The arrangement for the lower cone is the same as for the upper cone, except that the springs of the two cones are preferably arranged to lie with the springs of one set intermediate the springs of the other set, circumferentially of the device, as will be seen from the top and bottom views, Figs. 13 and 14.

Figure 15:
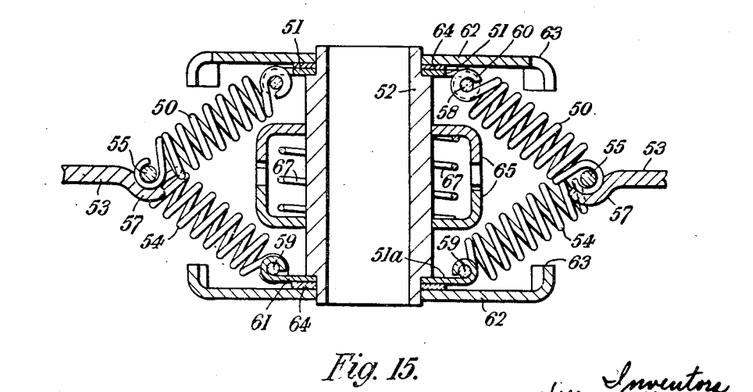
Fig. 15 is a vertical section of an embodiment of the invention according to the form diagrammatically shown in Figs. 12-14.
Figure 16:
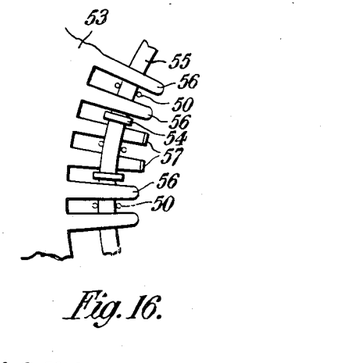
Figs. 16 and 17 are detail views of the same, Fig. 16 being on an enlarged scale.

An embodiment of the invention constructed in this manner is shown in Fig. 15. The two sets of springs 50 and 54 extend between the single base plate 53 and washers 51, 51a on the single central tube 52, which latter is adapted to receive a bolt whereby the instrument to be mounted can be secured to it, as was hereinbefore described in connection with Figs. 1 to 5. As is shown in Figs. 15 and 16, the outer ends of the springs 50 and 54 may be anchored to a wire 55 bent into a circle and secured in the plane of the base plate 53 by upwardly and downwardly bent tongues 56, 57 which project from the base plate 53 adjacent to the edge of the central opening therethrough. The inner ends of the springs are similarly secured, respectively, to wire 58 and 59 for the upper and lower series of springs, which are each bent into circular form and held by tongues 60, 61 which extend from the edges of washers 51, 51a.

For preventing excessive movement of the tube 52 and supported instrument under abnormal conditions a washer or plate 62 is preferably fixed on each end of the tube 52, these washers having fingers 63 the ends of which under the conditions mentioned engage the base plate 53. Each stop plate 62 is separated from the adjacent washer 51 or 51a by a washer 64, and the ends of the tube 52 may be turned over so as to hold the plates 62 and washers 51, 51a and 64 firmly in position.

Figure 17:
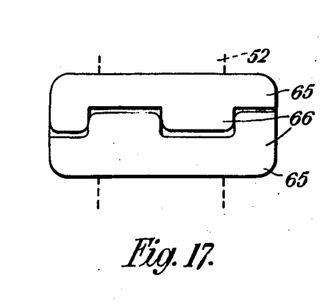

Means may be provided for damping resonant vibrations in the springs if necessary or desirable. One arrangement for this purpose is shown in Figs. 15 and 17. On the central tube 52 are slidably mounted two cylindrical metal cups 65 having interlocking fingers or teeth 66. Surrounding the tube 52 between the cups 65 is a helical spring 67 which presses the cups against the sides of the spring 50 and 54, and thus damps their vibrations.

Figure 18:
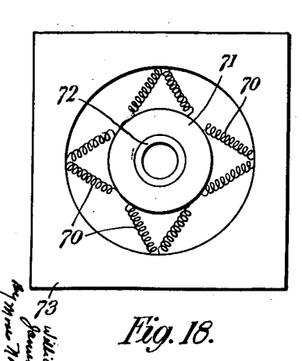
Fig. 18 is a diagramatic top plan view of a modified embodiment of the device in which helical springs are employed.

An alternative arrangement of the conically arranged springs is shown in Fig. 18, which is a view similar to that shown in Fig. 13. In place of each spring as hereinbefore described, such as the springs 50 shown in Fig. 15, two springs 70, 70 are employed, there being say four pairs for each conical arrangement. The inner ends of each pair of the springs 70, 70 are anchored to two points ninety degrees apart on a fixed washer or flange 71 on the central tube 72 whilst the outer ends are anchored at one point on the edge of the central opening through the base plate 73, which is here shown as a square plate, so that each spring gives a tangential pull on the central tube. With this alternative arrangement, the springs constitute resilient means, the outer surfaces of which constitute surfaces of the two opposed cones, which description also applies to the previously explained arrangement of the springs with their axes on the generating lines of the cones, as in Fig. 15; and as to all of the embodiments of the invention it may be said that they employ resilient means whose outer surfaces constitute surfaces (either continuous or interrupted) of two like hollow opposed truncated cones, held under equal tension when not loaded, the inclination of the cones to the base plate being so chosen in all cases as to give the equal deflection under equal forces acting in different planes, as has been described.

What we claim as our invention and desire to secure by Letters Patent is:

1. In a resilient mounting device, the combination of a base plate having a central opening therethrough, columnar means extending axially through said opening, and resilient means comprising like coaxial opposed truncated hollow rubber cones, attached at their bases to said base plate adjacent to its said opening and at their other ends to the opposite end portions of said columnar means, said cones being initially tensioned and held under equal tension when the device is not loaded, and the generating lines thereof being at an angle to said base plate of between about 35 and 45 degrees, said lines, if extended, producing apices of said cones on the axis of said columnar means adjacent to the junctions of said cones with said columnar means.

2. In a resilient mounting device, the combination of a base plate having a central opening therethrough, tubular means extending axially through said opening, resilient means comprising like coaxial opposed truncated hollow rubber cones, attached at their bases to said base plate adjacent to its said opening and at their other ends to the opposite end portions of said tubular means, said cones being initially tensioned and held under equal tension when the device is not loaded, and the generating lines thereof being at an angle to said base plate of between about 35 and 45 degrees, said lines, if extended, producing apices of said cones on the axis of said tubular means adjacent to the junctions of said cones with said tubular means, and load-securing means extending through said tubular means.

3. In a resilient mounting device, the combination of a base plate having a central opening therethrough, columnar means extending axially through said opening, and resilient means comprising two series of rubber strips separated from each other around said columnar means, one series on each side of said base plate extending around said columnar means, all of the same being secured at one end to said base plate and at the opposite end to an end portion of said columnar means, the outer surfaces of the strips of one series constituting surfaces of a truncated hollow cone and the outer surfaces of the strips of the other series constituting surfaces of a like opposed truncated hollow cone, all of said strips being initially tensioned and held under tension when the device is not loaded, and the generating lines of both cones being at an angle to said base plate of between about 35 and 45 degrees.

4. A resilient mounting device comprising a base plate having a central opening therethrough, a columnar member extending axially through said opening, and two sets of helical wire springs, one set on each side of said base plate, extending between said base plate and said columnar means, each set of springs being arranged with their axes on the surface of a cone, the generating lines of said opposed cones forming the same angle with the plane of said base plate, of between about 30 and 45 degrees, and, if extended, producing apices thereof on the axis of said columnar means closely adjacent to the junction of the springs therewith, and all of said springs being initially tensioned and held under equal tension when the device is not loaded.

5. A resilient mounting device comprising a base plate having a central opening therethrough, a columnar member extending axially through said opening, and two sets of helical wire springs, one set on each side of said base plate, extending between said base plate and said columnar means, each set of springs being arranged with their axes on the surface of a cone, the generating lines of said opposed cones forming the same angle with the plane of said base plate, of between about 30 and 45 degrees, and, if extended, producing apices thereof on the axis of said columnar means closely adjacent to the junction of the springs therewith, and all of said springs being initially tensioned and held under equal tension when the device is not loaded, and means for damping resonant vibrations in said springs.

6. A resilient mounting device comprising a base plate having a central opening therethrough, a columnar member extending axially through said opening, and two sets of helical wire springs, one set on each side of said base plate, extending between said base plate and said columnar means, each set of springs being arranged with their axes on the surface of a cone, the generating lines of said opposed cones forming the same angle with the plane of said base plate, of between about 30 and 45 degrees, and all of said springs being initially tensioned and held under equal tension when the device is not loaded, and means for damping resonant vibrations in said springs, mounted within said opposed hollow cones, comprising a pair of opposed cup-like members slidably mounted on said columnar member, and spring means positioned within said cup-like members, arranged to press the same axially away from each other, into contact with the inner surfaces of said helical wire springs.

7. In a resilient mounting device, the combination of a rigid plate having an opening therethrough, means forming a central column extending axially through said opening, and resilient means attached to said plate adjacent said opening and to the opposite end portions of said columnar means, said resilient means being so connected between said base plate and said columnar means that lines joining points of attachment to the base plate with points of attachment to the opposite ends of the columnar means and lying in planes perpendicular to the base plate will generate two like coaxial opposed truncated hollow cones, the generating lines of said cones, if extended, producing apices thereof on the axis of said columnar means closely adjacent to the junctions of said resilient means therewith, said resilient means being initially tensioned and held under equal tension on both sides of said plate when the device is not loaded, said plate and columnar means constituting two members, one of which serves for the attachment of the mounting to a supporting body while the other constitutes a support for a body which is to be supported by the mounting, said mounting device adapted to receive means for attachment of one of said bodies to at least one end portion thereof, beyond the junctions of said resilient means therewith and adjacent to one of said apices, the generating lines of both cones being at an angle to said plate of between about 30 and 45 degrees, so that said resilient means will, under a predetermined load, impose substantially equal resistance to relative movement between said plate and columnar means in all planes.

8. In a resilient mounting device, the combination of a base plate having a central opening therethrough, of means forming a central column extending axially through said opening, and resilient means attached to said base plate adjacent said opening in a circular zone of comparatively large radius and attached to substantially opposite end portions only of said column in circular zones of substantially equal and comparatively small radii, said resilient means being initially under tension and held under equal tension on both sides of said base plate when the device is not loaded, the resilient means extending between said base plate and column end portions at uniform angles with respect to the plane of the base plate of between 30 and 45°, so chosen that the resilient means will, under a predetermined load, impose substantially equal resistance to relative movement between said base plate and column in all planes, said mounting device adapted to receive means for the attachment of a body to be supported to one end portion thereof beyond but adjacent to the junction of the adjacent resilient means therewith.

9. In a resilient mounting device a combination as claimed in claim 7, comprising stop plates mounted on the ends of said columnar means, and wherein each of said resilient means comprises a flange secured to said base plate and having thereon resilient bosses which coact with the adjoining stop plate to limit the lengthwise movement of said columnar means relative to said base plate.

10. In a resilient mounting device a combination as claimed in claim 7, comprising stop plates mounted on the ends of said columnar means, and wherein each of said resilient means comprises a flange secured to said base plate which coacts with the adjoining stop plate to limit the lengthwise movement of said columnar means relative to said base plate and said columnar means carries a sleeve which coacts with said flanges to limit the transverse movement of said columnar means relative to said base plate.

WILLIAM EDWARD BARBER.
JAMES ORMOND COLE.

REFERENCES CITED

The following references are of record in the file of this patent:

UNITED STATES PATENTS

| Number | Name | Date |
|---|---|---|
| 1,602,922 | Midboe | Oct. 12, 1926 |
| 1,901,945 | Avery | Mar. 21, 1933 |
| 1,938,799 | Bourne | Dec. 12, 1933 |
| 2,018,860 | Lord | Oct. 29, 1935 |
| 2,068,279 | Piron | Jan. 19, 1937 |

FOREIGN PATENTS

| Number | Country | Date |
|---|---|---|
| 571,026 | Great Britain | Oct. 15, 1946 |